(12) United States Patent
Venkatesan et al.

(10) Patent No.: US 9,830,091 B2
(45) Date of Patent: Nov. 28, 2017

(54) POLICY-BASED DATA TIERING USING A CLOUD ARCHITECTURE

(71) Applicant: NetApp, Inc., Sunnyvale, CA (US)

(72) Inventors: Vivek Venkatesan, Morrisville, NC (US); Alvin Lam, Vancouver (CA); Varun Ganesh, Cary, NC (US); Emalayan Vairavanathan, Vancouver (CA)

(73) Assignee: NETAPP, INC., Sunnyvale, CA (US)

( * ) Notice: Subject to any disclaimer, the term of this patent is extended or adjusted under 35 U.S.C. 154(b) by 167 days.

(21) Appl. No.: 14/627,034

(22) Filed: Feb. 20, 2015

(65) Prior Publication Data

US 2016/0246517 A1 Aug. 25, 2016

(51) Int. Cl.
*G06F 3/06* (2006.01)

(52) U.S. Cl.
CPC ............ *G06F 3/0619* (2013.01); *G06F 3/065* (2013.01); *G06F 3/067* (2013.01); *G06F 3/0649* (2013.01)

(58) Field of Classification Search
CPC . G06F 11/1446–11/1469; G06F 3/0647–3/065
See application file for complete search history.

(56) References Cited

U.S. PATENT DOCUMENTS

| | | | | |
|---|---|---|---|---|
| 2009/0254960 A1* | 10/2009 | Yarom | ............... | G06F 17/30781 725/115 |
| 2009/0320033 A1* | 12/2009 | Gokhale | ............... | G06F 9/5011 718/103 |
| 2014/0006357 A1* | 1/2014 | Davis | .................. | G06F 11/1464 707/667 |
| 2014/0149794 A1* | 5/2014 | Shetty | ................. | H04L 67/1095 714/20 |
| 2014/0304473 A1* | 10/2014 | Zachariassen | ...... | G06F 12/0897 711/122 |
| 2015/0227602 A1* | 8/2015 | Ramu | ............... | G06F 17/30575 707/634 |

* cited by examiner

*Primary Examiner* — Nicholas Simonetti
(74) *Attorney, Agent, or Firm* — Gilliam IP PLLC

(57) ABSTRACT

A storage platform computing apparatus obtains a lifecycle management policy and configuration information for a cloud repository identified in the lifecycle management policy. The configuration information includes at least one access parameter for the cloud repository. The lifecycle management policy is applied to determine when an object is required to be replicated to the cloud repository in response to a received write request. A request to store the object in the cloud repository is generated, when the object is determined to be required to be stored in the cloud repository, wherein the request includes the access parameter. The request is sent to the cloud repository using a representational state transfer (REST) interface associated with the cloud repository.

17 Claims, 6 Drawing Sheets

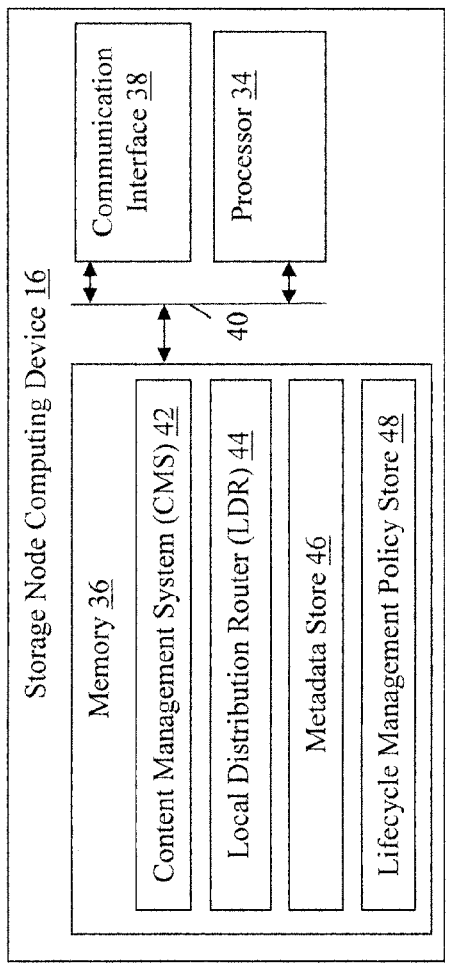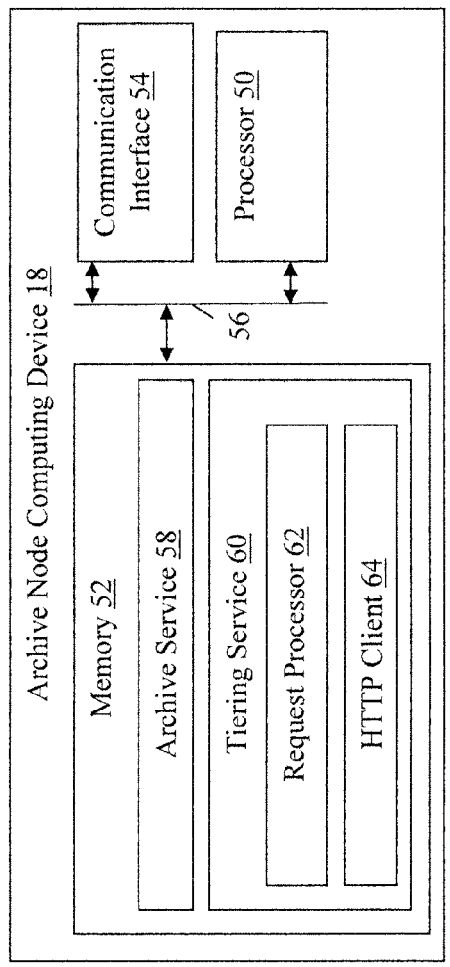

POLICY-BASED DATA TIERING USING A CLOUD ARCHITECTURE

FIELD

This technology relates to archival data storage, and more particularly to methods and devices for policy-based tiered storage of archival data using a cloud architecture.

BACKGROUND

Enterprises increasingly have a need to store large amounts of data including in archive storage systems, media content repositories, and other large scale web data stores, for example. With respect to archival storage by way of example, enterprises often utilize disk-based storage devices, tape-based storage devices, and/or other hardware storage devices located in the enterprise data center or storage network to store objects that include unstructured data, as well as replicas of the objects.

In some implementations, hardware solutions having various capabilities with respect to response speed or storage size, for example, are utilized as tiers for storing data having various associated requirements or usage. For example, data more likely to be retrieved often may be stored in relatively fast disk-based storage devices and, conversely, data unlikely to be retrieved often may be stored in relatively slow tape-based storage devices. Many other permutations of storage devices are used for tiered storage of various types of data according to policies established by enterprise data storage system administrators.

However, the storage devices that comprise enterprise storage networks have an associated cost of ownership and operation that may be undesirable for some enterprises for purposes of satisfying certain aspects of their storage requirements. The cost of operation can include the cost of manual data management and associated increased likelihood of introducing errors. The storage device hardware ownership and operational cost can be particularly undesirable when unaligned with the variable data storage requirements of some enterprises. Additionally, data storage system and associated hardware storage devices do not provide sufficient flexibility or scalability currently desired by many enterprises.

SUMMARY

A method for policy-based data tiering using a cloud architecture includes obtaining, by a storage platform computing apparatus, a lifecycle management policy and configuration information for a cloud repository identified in the lifecycle management policy in response to a received write request. The configuration information includes at least one access parameter for the cloud repository. The lifecycle management policy is applied, by the storage platform computing apparatus, to determine when an object is required to be replicated to the cloud repository. A request to store the object in the cloud repository is generated by the storage platform computing apparatus, when the object is determined to be required to be stored in the cloud repository, wherein the request includes the access parameter. The request is sent, by the storage platform computing apparatus, to the cloud repository using a representational state transfer (REST) interface associated with the cloud repository.

A non-transitory computer readable medium having stored thereon instructions for policy-based data tiering using a cloud architecture comprising executable code which when executed by a processor, causes the processor to perform steps including obtaining a lifecycle management policy and configuration information for a cloud repository identified in the lifecycle management policy in response to a received write request. The configuration information includes at least one access parameter for the cloud repository. The lifecycle management policy is applied to determine when an object is required to be replicated to the cloud repository. A request to store the object in the cloud repository is generated, when the object is determined to be required to be stored in the cloud repository, wherein the request includes the access parameter. The request is sent, by the storage platform computing apparatus, to the cloud repository using a REST interface associated with the cloud repository.

A storage platform computing apparatus including a processor and a memory coupled to the processor which is configured to be capable of executing programmed instructions comprising and stored in the memory to obtain a lifecycle management policy and configuration information for a cloud repository identified in the lifecycle management policy in response to a received write request. The configuration information includes at least one access parameter for the cloud repository. The lifecycle management policy is applied to determine when an object is required to be replicated to the cloud repository. A request to store the object in the cloud repository is generated, when the object is determined to be required to be stored in the cloud repository, wherein the request includes the access parameter. The request is sent, by the storage platform computing apparatus, to the cloud repository using a REST interface associated with the cloud repository.

This technology provides a number of advantages including providing methods, non-transitory computer readable media, and devices that facilitate policy-based archival data storage for enterprises using a cloud architecture. With this technology, many different types and numbers of cloud-based external storage tiers can be utilized for data storage using REST interfaces. This technology provides administrators with the ability to enable scalable tiered storage using cloud tier instances. By allowing administrators to establish policies for implementing cloud-based storage tiers, manual data management in the storage network, which is more susceptible to introducing errors, can advantageously be reduced or eliminated.

This technology also enables administrators to implement a cost-based hierarchy of external storage tiers to store objects and facilitates high availability of objects from multiple geographic locations with the same namespace. Moreover, the cloud tier in this technology can advantageously be deployed as a temporary data store when expanding a saturated storage platform is being considered. Object copies can advantageously be stored in a cloud tier as-is to allow out of band access to the object or obfuscated with the storage platform controlling the namespace. Additionally, this technology advantageously facilitates federating between multiple instances of the exemplary platform of this technology in order to facilitate sharing of data and metadata.

BRIEF DESCRIPTION OF THE DRAWINGS

FIG. 2 is a block diagram of the exemplary storage node computing device;

FIG. 3 is a block diagram of the exemplary archive node computing device;

DETAILED DESCRIPTION

Figure 1:
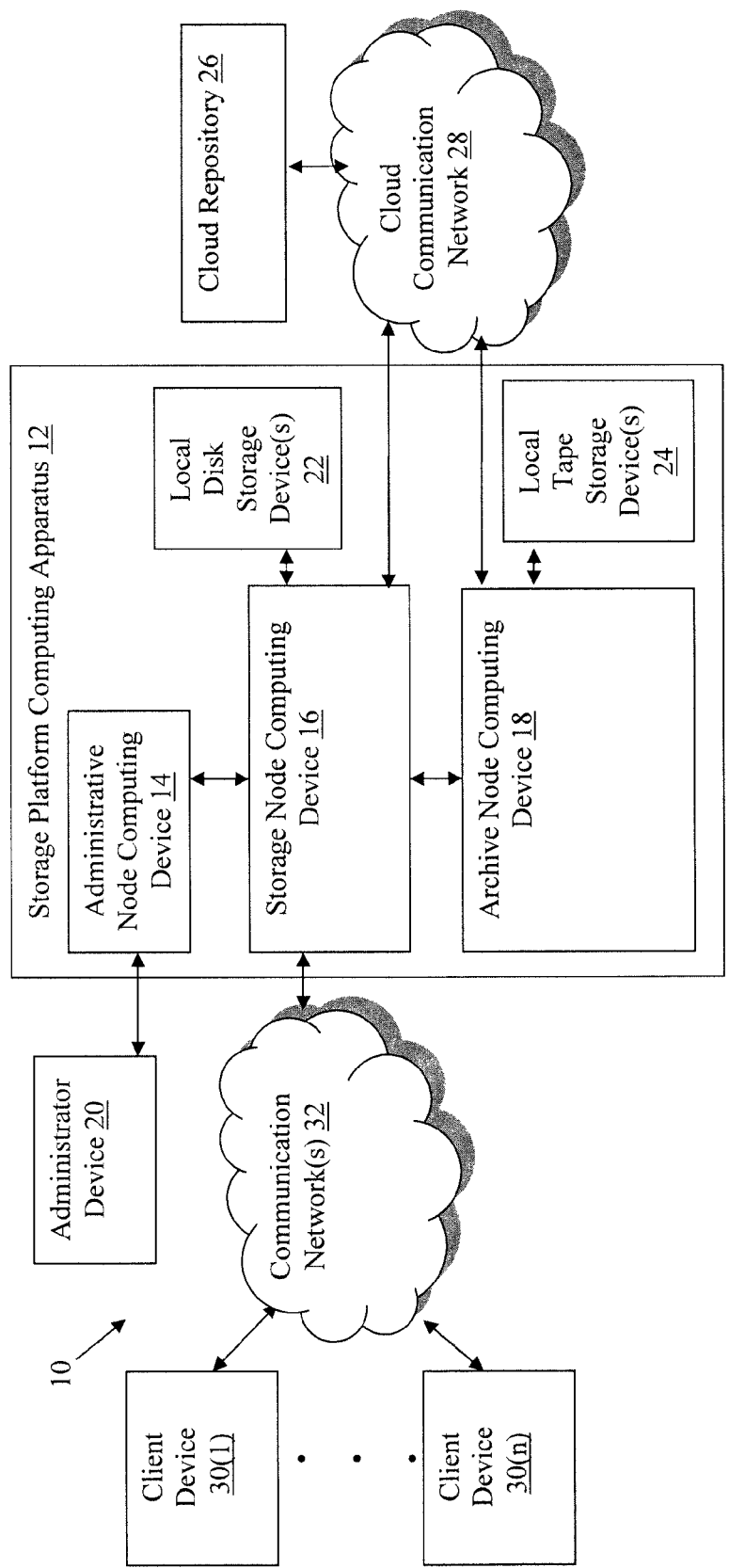
FIG. 1 a block diagram of a network environment with an exemplary storage platform computing apparatus with an exemplary administrator node, storage node, and archive node computing devices.

A network environment 10 including an example of a storage platform computing apparatus 12 is illustrated in FIG. 1. The storage platform computing apparatus 12 includes an administrative node computing device 14 coupled to a storage node computing device 16. The storage platform computing apparatus 12 also includes an archive node computing device 18 that is coupled to the storage node computing device 16. The administrative node computing device 14 is coupled to an administrator device 20 and the storage node computing device 16 is coupled to local disk storage device(s) 22. Additionally, the archive node computing device 18 is coupled to local tape storage device(s) 24 and the archive node computing device 18 and storage node computing device are in communication with a cloud repository 26 over a cloud communication network 28.

The network environment 10 further includes client devices 30(1)-30(n) that communicate with the storage node computing device 16 over communication network(s) 32 to store data on, and retrieve data from, the local disk storage device(s) 22, local tape storage device(s) 24, and cloud repository 26 in this example, as described and illustrated in more detail later. In other examples, this environment 10 can include other numbers and types of systems, devices, components, and/or elements in other configurations. This technology provides a number of advantages including methods, non-transitory computer readable media, and devices that facilitate policy-based storage of data on tiers that include cloud-based storage tiers.

Each of the client devices 30(1)-30(n) includes a processor, a memory, a communication interface, and, optionally, an input device and a display device, which are coupled together by a bus or other communication link, although the client devices 30(1)-30(n) can have other types and numbers of components or other elements. The client devices 30(1)-30(n) may communicate with the storage node computing device 16 to store and retrieve data, as described and illustrated in more detail later. One or more of the client devices 30(1)-30(n) may be, for example, a conventional personal computer, a server hosting application(s) that utilize back-end storage provided by the storage platform computing apparatus 12 and/or cloud repository 26, or any other type of processing and/or computing device.

The administrator device 20 includes a processor, a memory, a communication interface, an input device, and a display device, which are coupled together by a bus or other communication link, although the administrator device 20 can have other types and numbers of components or other elements. The administrator device 20 may communicate with the administrative node computing device 14 to establish policies for storing the data communicated by the client devices 30(1)-30(n) on the storage platform computing apparatus 12 and/or the cloud repository 26, as described and illustrated in more detail later.

The administrator device 20 communicates with the administrative node computing device 14 over a local area network (LAN) (not shown) in this example, although the administrator device 20 can also communicate with the administrative node computing device 14 over the communication network(s) 32 in other examples. The administrator device 20 can be a conventional personal computer, a laptop, a tablet computing device, a smart phone, or any other type of processing and/or computing device.

The administrative node computing device 14 includes a processor, a memory, and a communication interface, which are all coupled together by a bus or other communication link, although the administrative node computing device 14 can have other types and numbers of components or other elements. The administrative node computing device 14 may provide an interface to the administrator device 20 for receiving data storage policies that establish various tiers on which to store data received from the client devices 30(1)-30(n). In this example, the tiers can include combinations of the local disk storage device(s) 22, the local tape storage device(s) 24, and the cloud repository 26, as described and illustrated in more detail later, although other types and numbers of storage devices and tiers can also be used.

In examples in which a received policy identifies the cloud repository 26 as a storage location for data, the administrative node computing device 14 can also obtain configuration information for the cloud repository 26 via the interface provided to the administrator device 20 by the administrative node computing device 14. The administrative node computing device 14 can store the received policies and configurations information, and optionally perform other functions, such as configuring, and/or monitoring the status of, the various devices of the storage platform computing apparatus 12, for example.

The local disk storage device(s) 22 can include optical disk-based storage, solid state drives, or any other type of relatively fast storage devices suitable for storing relatively small quantities of objects for relatively short term retention to for ever, for example. The local tape storage device(s) 24 can be tape drives archive-formatted with a linear tape file system format or any other type of relatively slow storage devices suitable for storing relatively large quantities of archived files or objects for relatively long term retention, for example. Other types and numbers of storage deices can be coupled to the storage node computing device 16 and/or archive node computing device 18 in other examples.

The cloud repository 26 includes a processor, a memory, and a communication interface, which are all coupled together by a bus or other communication link, although the cloud repository 26 can have other types and numbers of components or other elements. The cloud repository 26 can be a server computing device or any other type of storage device configured to store large quantities of files or objects at the direction of the storage node computing device 16 or archive node computing device 18 over the cloud communication network 28.

In some examples, the cloud repository 26 can be a bucket or volume spanning any number of server computing device(s) or other storage device(s) in a cloud storage provider's network, and any number of cloud repositories hosted by any number of cloud storage providers can be in communication with the cloud communication network 28 or another cloud communication network. The cloud repository 26 can be an Amazon Web Service (AWS) Simple Storage Services (S3) or Glacier repository available from Amazon Web Services, Inc. of Seattle, Wash., for example, or any other cloud repository exporting a RESTful interface for data movement that can be utilized as described and illustrated in more detail later.

By way of example only, the cloud communication network 28 can use TCP/IP over Ethernet and industry-standard protocols, including NFS, CIFS, SOAP, XML, LDAP, and SNMP, although other types and numbers of communication networks, can be used. The cloud communication network 28 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

Referring to FIG. 2 a block diagram of the exemplary storage node computing device 16 is illustrated. The storage node computing device 16 is configured to receive requests to write and read archive data from the client devices 30(1)-30(n) over the communication network(s) 32. In response to requests to write data, the storage node computing device 16 generally communicates with the administrative node computing device 14 to determine where to store the data (e.g., on one or more of the local disk storage device(s) 22, local tape storage device(s) 24, or cloud repository 26) according to an associated stored policy established by an administrator. Based on the determination, the storage node computing device 16 stores the data as object(s), and replicas of the object(s), on the local disk storage device(s) 22 and/or the cloud repository 26, and/or communicates with the archive node computing device 18 to store the data and/or replicas on the local tape storage device(s) 24, as described and illustrated in more detail later.

Accordingly, the storage node computing device 16 in this example includes a processor 34, a memory 36, and a communication interface 38, which are all coupled together by a bus 40 or other communication link, although the storage node computing device 16 can have other types and numbers of components or other elements. The processor 34 of the storage node computing device 16 executes a program of stored instructions for one or more aspects of this technology, as described and illustrated by way of the embodiments herein, although the processor 34 could execute other numbers and types of programmed instructions. The processor 34 in the storage node computing device 16 may include one or more central processing units or general purpose processors with one or more processing cores, for example.

The memory 36 of the storage node computing device 16 may include any of various forms of read only memory (ROM), random access memory (RAM), Flash memory, non-volatile, or volatile memory, or the like, or a combination of such devices for example. In this example, the memory 36 further includes a content management system (CMS) 42, a local distribution router (LDR) 44, a metadata store 46, and a lifecycle management policy store 48, although other numbers and types of modules and applications can also be included in the memory 36 and one or more of the CMS 42, LDR 44, metadata store 46, or lifecycle management policy store 48 can be stored elsewhere on the storage platform computing apparatus 12.

The CMS 42 in this example stores content metadata in the metadata store 46 and manages content replication based on the implementation of information lifecycle management rules established by policies stored in the lifecycle management policy store 48 by administrators. The metadata in the metadata store 46 can include system or user metadata including storage locations of objects storing archived data. The lifecycle management policy store 48 stores policies established based on input received from administrators via the administrator device 20 and administrative node computing device 14. The policies can establish rules defining various aspects of the archival storage of data on the storage platform computing apparatus 12 and/or cloud repository 26, as described and illustrated in more detail later. The LDR 44 stores, moves, verifies, and retrieves objects stored on local media, such as the local disk storage device(s) 22, for example.

The communication interface 38 of the storage node computing device 16 in this example operatively couples and communicates between the storage node computing device 16 and the client devices 30(1)-30(n), which are coupled together by the communication network(s) 32, and optionally one or more of the administrative node computing device 14, archive node computing device 18, cloud repository 26, or local disk storage device(s) 22, although other types and numbers of communication networks or systems with other types and numbers of connections and configurations to other devices and elements can also be used.

By way of example only, the communication network(s) 32 can use TCP/IP over Ethernet and industry-standard protocols, including NFS, CIFS, SOAP, XML, LDAP, and SNMP, although other types and numbers of communication networks, can be used. The communication network(s) 32 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

In this example, the administrative node computing device 14 can communicate with the storage node computing device, the storage node computing device 16 can communicate with the archive node computing device 18, the local disk storage device(s) 22, and/or the cloud repository 26, and the archive node computing device 18 can communicate with the local tape storage device(s) 24 and/or the cloud repository 26 using TCP/IP over Ethernet, although other types of protocols can also be used. Additionally, one or more of the administrative node computing device 14, storage node computing device 16, and/or archive node computing device 18 can be present in the storage platform computing apparatus 12 as a single device in other examples.

Referring to FIG. 3, a block diagram of the exemplary archive node computing device 18 is illustrated. The archive node computing device 18 is generally configured to receive requests from the storage node computing device 16 to write archive data to the local tape storage device(s) 24 and cloud repository 26 and to read archive data from the local tape storage device(s) 24 and cloud repository 26. Accordingly, the archive node computing device 18 in this example includes a processor 50, a memory 52, and a communication interface 54, which are all coupled together by a bus 56 or other communication link, although the archive node computing device 18 can have other types and numbers of components or other elements.

The processor 50 of the archive node computing device 18 executes a program of stored instructions for one or more aspects of this technology, as described and illustrated by way of the embodiments herein, although the processor 50 could execute other numbers and types of programmed instructions. The processor 50 in the archive node computing device 18 may include one or more central processing units or general purpose processors with one or more processing cores, for example.

The memory 52 of the archive node computing device 18 may include any of various forms of read only memory (ROM), random access memory (RAM), Flash memory, non-volatile, or volatile memory, or the like, or a combination of such devices for example. In this example, the memory 52 further includes an archive service 58 and a tiering service 60, which includes a request processor 62 and a hypertext transfer protocol (HTTP) client 64, although other numbers and types of modules and applications can also be included in the memory 52 and one or more of the archive service 58, tiering service 60, request processor 62, or hypertext transfer protocol (HTTP) client 64 can be stored elsewhere on the storage platform computing apparatus 12. While the client is an HTTP client in the examples described herein, clients associated with other protocols can also be used.

The archive service 58 stores data to, and retrieves data from, the local tape storage device(s) 24, and also communicates with the tiering service 60 to store data to, and retrieve data from, the cloud repository 26, in response to requests received from the storage node computing device 16. The request processor 62 of the tiering service 60 receives and processes requests from the archive service 58 to store data on the cloud repository 26. The HTTP client 64 of the tiering service 60 provides an HTTP interface used to exchange data with the cloud repository 26, as described and illustrated in more detail later.

The communication interface 54 of the archive node computing device 18 in this example operatively couples and communicates between the archive node computing device 18 and the storage node computing device 16, the archive node computing device 18 and the local tape storage device(s) 24, and the archive node computing device 18 and the cloud repository 26 via the cloud communication network 28, as described and illustrated in more detail earlier, although other types and numbers of communication networks or systems with other types and numbers of connections and configurations to other devices and elements can also be used.

Although examples of the client devices 30(1)-30(n), administrator device 20, administrative node computing device 14, storage node computing device 16, archive node computing device 18, local disk storage device(s) 22, local tape storage device(s) 24, and cloud repository 36 are described herein, it is to be understood that the devices and systems of the examples described herein are for exemplary purposes, as many variations of the specific hardware and software used to implement the examples are possible, as will be appreciated by those skilled in the relevant art(s). In addition, two or more computing systems or devices can be substituted for any one of the systems in any embodiment of the examples.

The examples also may be embodied as one or more non-transitory computer readable media having instructions stored thereon for one or more aspects of the present technology, as described and illustrated by way of the examples herein, which when executed by a processor, cause the processor to carry out the steps necessary to implement the methods of this technology, as described and illustrated with the examples herein.

Figure 4:
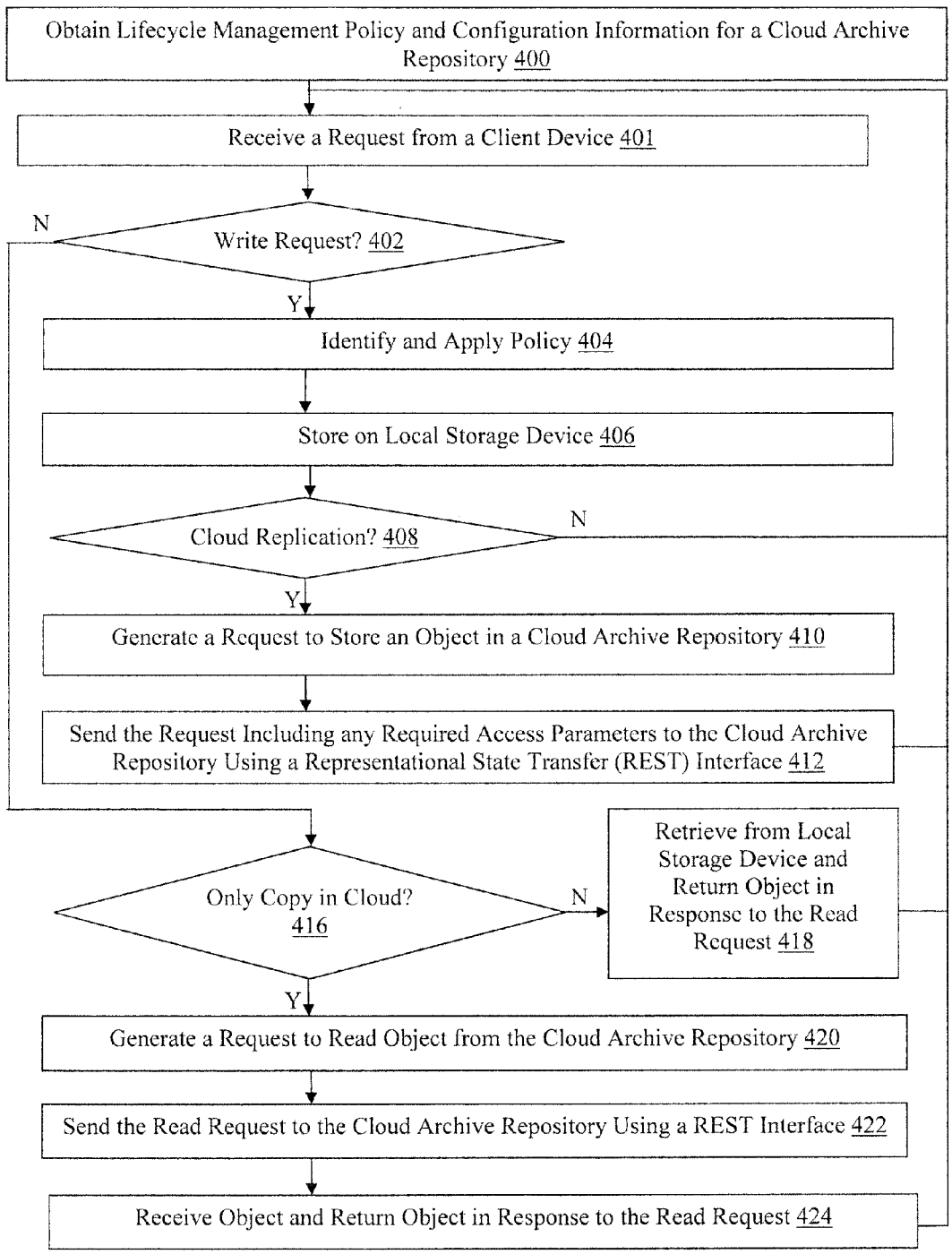
FIG. 4 is a flowchart of an exemplary method for policy-based data tiering using a cloud architecture.

An exemplary method for policy-based data tiering using a cloud architecture will now be described with reference to FIGS. 1-8. Referring more specifically to FIG. 4, in step 400 in this example, the administrative node computing device 14 of the storage platform computing apparatus 12 obtains at least one lifecycle management policy and configuration information for a cloud repository, such as the cloud repository 26 illustrated in FIG. 1. The lifecycle management policy and configuration information can be obtained from an administrator using the administrator device 20 via an interface provided by the administrative node computing device 14.

The lifecycle management policy can specify the number of copies or replicas of objects that should be stored, specification(s) (e.g., retrieval speed or other service level objective) of the various tier(s) in which objects or object copies should be stored, and/or how long objects or object copies should be retained in various tier(s), for example, although the policies can also define other rules. In this example, the lifecycle management policy received in step 400 identifies at least one tier associated with the cloud repository 26. Accordingly, the configuration information includes at least one access parameter for the cloud repository 26, such as a unique login, access key, and/or network location/endpoint information for the cloud repository, for example. The obtained lifecycle management policy is stored in the lifecycle management policy store 48. Additionally, the configuration information is stored in the memory 36 in a configuration persistent store, optionally as associated with a unique identifier or tag that can be used to retrieve objects and simplify configuration updates, as described and illustrated in more detail later.

In one example, an administrator can establish a policy that specifies that, for data having certain characteristics (e.g., type or origin), an object including the data will be stored on tape in the local tape storage device(s) 24 and one copy of the object will be stored in an AWS S3 bucket in the cloud repository 26, wherein the object stored in the local tape storage device(s) 24 is to be retained for six months and the replica stored in the cloud repository is to be retained indefinitely. Accordingly, with this technology, the administrator can establish tiers of archive storage for data that includes both local and cloud storage. Optionally, any number of cloud repositories provided by any number of cloud storage vendors and having various characteristics or specifications can be identified in a lifecycle management policy, as described and illustrated in more detail later with reference to FIG. 5.

In step 401, the storage node computing device 16 of the storage platform computing apparatus 12 receives a request from one of the client devices 30(1)-30(n) via the communication network(s) 32. In step 402, the storage node computing device 16 of the storage platform computing apparatus 12 determines whether the request is a request to write data. If the storage node computing device 16 determines that a write request has been received, then the Yes branch is taken to step 404. In step 404, the storage node computing device 16 of the storage platform computing apparatus 12 identifies a lifecycle management policy in the lifecycle management policy store 48 that is applicable to the data included in the received write request (e.g., based on one or more parameters of the request and/or characteristics of the data).

In step 406, the storage node computing device 16 of the storage platform computing apparatus 12 stores an object including the data on local storage, such as one of the local disk storage device(s) 22 or local tape storage device(s) 24, according to the applied lifecycle management policy. If the data is required to be stored in an object on the local tape storage device(s) 24, the storage node computing device 16 optionally sends a request to store the data to the archive node computing device 18, which stores the data on the local tape storage device(s) 24 on behalf of the storage node computing device 16 in this example. Subsequent to storing the object including the data, the storage node computing device 16 or archive node computing device 18 optionally updates metadata associated with the object, including at least a local storage location of the object, in the metadata store 46.

In step 408, the storage node computing device 16 of the storage platform computing apparatus 12 determines, based on the application of the lifecycle management policy in step 404, whether cloud replication is required for the data identified in the write request received in step 402. If the storage node computing device 16 of the storage platform computing apparatus 12 determines in step 408 that cloud replication is not required, then the No branch is taken back to step 401. However, if the storage node computing device 16 of the storage platform computing apparatus 12 determines in step 408 that cloud replication is required, then the Yes branch is taken to step 410.

In step 410, the storage node computing device 16 of the storage platform computing apparatus 12 sends a request to store the data to the archive node computing device 18 of the storage platform computing apparatus 12. Optionally, the request includes information associated with the cloud repository 26 to which the data is to be stored. The information can include configuration information previously stored in the memory 36, and retrieved by the storage node computing device 16 upon determining that cloud replication was required in step 408. While in this particular example, the archive node computing device 18 is used as the integration to the cloud repository 26, in other examples, the storage node computing device 16 can communicate directly with the cloud repository 26 to store the data in response to the client write request.

Figure 5:
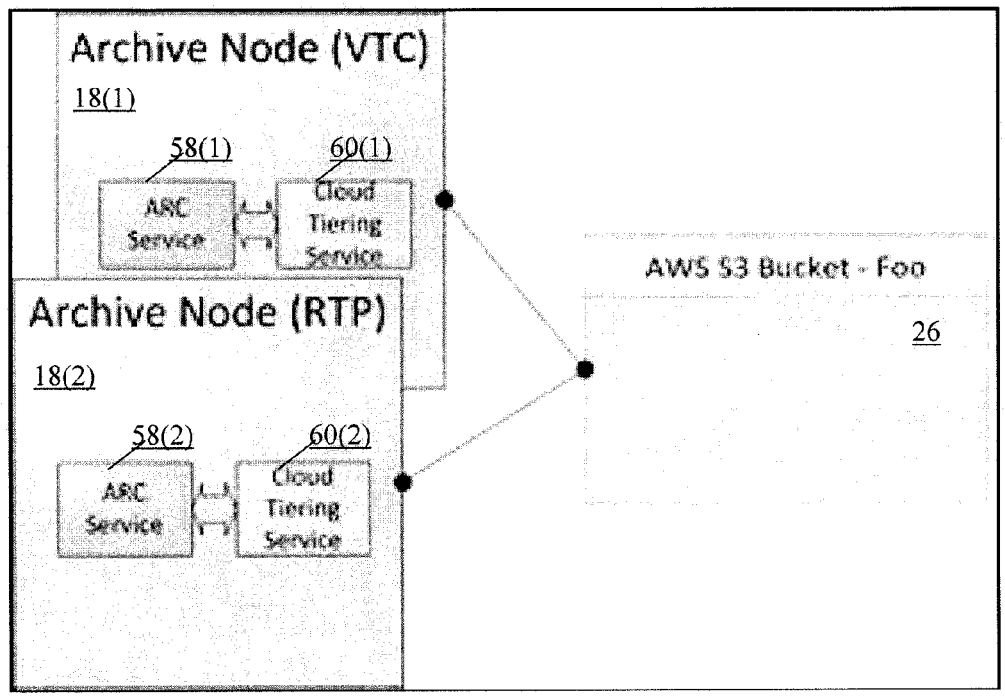
FIG. 5 is a block diagram including a plurality of the exemplary archive node computing devices and a cloud repository illustrating scale-out capabilities of this technology.

Referring more specifically to FIG. 5, a block diagram including a plurality of the exemplary archive node computing devices 18(1) and 18(2) and the cloud repository 26 illustrating scale-out capabilities of this technology will now be described. In this particular example, the enterprise's data storage network includes archive node computing devices 18(1) and 18(2) located in geographically disparate locations. Accordingly, the storage node computing device 16 can send the request in this particular example to one of the archive node computing devices 18(1) and 18(2) located geographically closer to the cloud repository 26.

The storage node computing device 16 can maintain a listing of the geographic locations of the archive node computing devices 18(1) and 18(2) in the enterprise's network, as well as the geographic locations of the cloud repositories, in order to identify one of the archive node computing devices 18(1) or 18(2) to which the request should be sent, although other methods of identifying the one of the archive node computing devices 18(1) or 18(2) can also be used. By sending the request to the archive node computing device 18(1) or 18(2) located geographically closer to the cloud repository 26, the storage node computing device 16 can effectively load balance based on locality with this technology, resulting in more efficient storage operations and effective scaling-out of the enterprise data storage network.

Referring back to FIG. 4, in response to the request sent by the storage node computing device 16 in step 410 in this example, the archive node computing device 18 of the storage platform computing apparatus 12 generates a request to store an object including the data in the cloud repository 26. In this example, the request generated by the archive node computing device 18 can be a hypertext transfer protocol (HTTP) request, although other types of requests can be used in other examples. Optionally, the archive node computing device 18 can request a copy of the object to be replicated from the storage node computing device 16, which can retrieved it from the local disk storage device(s) 22, as described and illustrated in more detail later with reference to FIG. 7. Alternatively, the storage node computing device 16 can send a copy of the object along with the request to the archive node computing device 18, for example, although other methods of obtaining a copy of the object to be replicated can also be used.

In step 412, the archive node computing device 18 of the storage platform computing apparatus 12 sends the request and the object replica to the cloud repository 26 using a representational state transfer (REST) interface provided by the cloud repository. The request can be generated by the archive node computing device 18 using the configuration information included in the request received by the archive node computing device 18 from the storage node computing device 16. The configuration information includes specifications for the REST interface of the cloud repository 26 (e.g., an endpoint network location) and any access parameters (e.g., an access key) required for the archive node computing device 18 to store the object including the data on the cloud repository 26.

Optionally, subsequent to sending the request, the archive node computing device 18 can communicate with the storage node computing device 16 to store metadata for the object in the metadata store 46 including an indication of an archived storage location of the object. The object metadata is optionally associated with the unique tag for the configuration information that was generated and stored as associated with the configuration information in step 400. The metadata can be subsequently used to process requests to read the archived object, as described and illustrated in more detail later with reference to steps 416-424 of FIG. 4 and FIG. 8. By using a unique tag, only the stored configuration information itself, and not the metadata for each object stored in the cloud repository 26, has to be modified when there is an update to the configuration information (e.g., to an access key).

Figure 6:
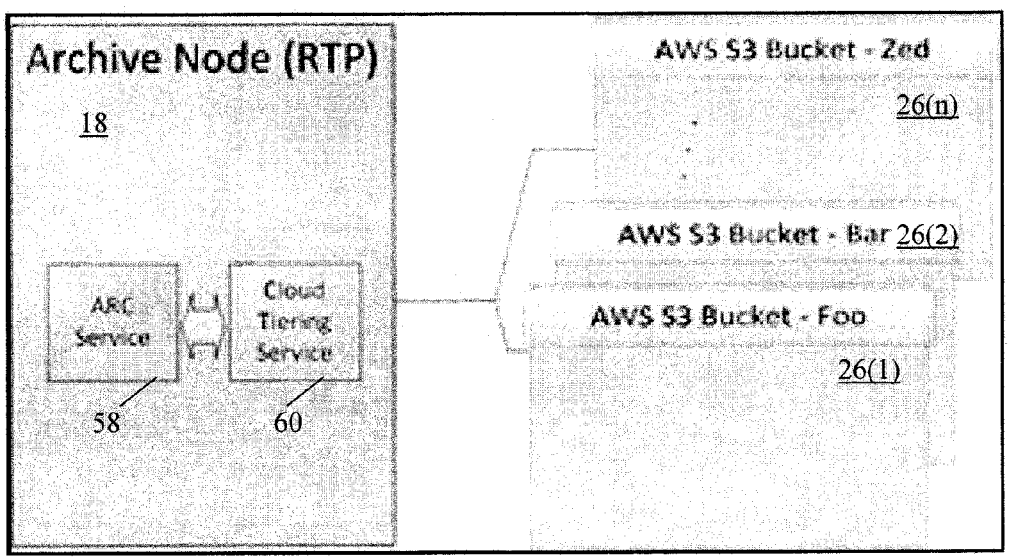
FIG. 6 is a block diagram including the exemplary archive node computing device and a plurality of cloud repositories illustrating scale-up capabilities of this technology.

Referring more specifically to FIG. 6, a block diagram including the exemplary archive node computing device 18 and a plurality of cloud repositories 26(1) and 26(2)-26(n) illustrating scale-up capabilities of this technology will now be described. In this particular example, the archive node computing device 18 is in communication with a plurality of cloud repositories 26(1)-26(n) (referred to in FIG. 6 as AWS S3 buckets). In this example, the lifecycle management policy obtained in step 400 could provide for replication of specified objects into various cloud repositories 26(1)-26(n). For example, each of the cloud repositories 26(1)-26(n) could correspond to one department (e.g., finance or engineering) of an enterprise.

In other examples, one of the cloud repositories 26(1)-26(n) could be a relatively fast and expensive AWS S3 bucket and another of the cloud repositories could be a relatively slow and inexpensive AWS Glacier bucket. In this example, the lifecycle management policy may specify that certain objects are to be replicated to the AWS S3 bucket for one week and to the AWS Glacier bucket for 5 years. In yet other examples, each of the cloud repositories 26(1)-26(n) is hosted by a different cloud storage provider or is associated with one or more storage specifications (e.g., retrieval speed or cost) different from storage specifications of one or more other of the cloud repositories 26(1)-26(n).

In examples in which a plurality of cloud repositories 26(1)-26(n) are used to implement policy-based tiered storage of archive data, configuration information for each of the cloud repositories 26(1)-26(n) is obtained in step 400 and multiple requests are generated in step 410 and send in step 412, as described and illustrated in more detail earlier. Other permutations of cloud repositories 26(1)-26(n) and other lifecycle management policies can also be used.

Referring back to FIG. 4, if the storage node computing device 16 of the storage platform computing apparatus 12 determines in step 402 that the received request is not a request to write data then the No branch is taken to step 416. In step 416, the storage node computing device 16 of the storage platform computing apparatus 12 determines whether the only copy of the object storing the requested data is located in the cloud repository 26. In the example described earlier, the local copy of the object may not be retained any longer due to expiration of the retention time indicated in the policy applied to the data in step 404, although the only copy of the object may be in the cloud repository for other reasons.

Optionally, the storage node computing device 16 can determine that the only copy of the object is in the cloud repository 26 based on metadata retrieved for the object from the metadata store 46, although other methods of determining that the only copy of the object is located in the cloud repository 26 can also be used. If the storage node computing device 16 determines in step 416 that the cloud repository 26 is not storing the only copy of the object, then the No branch is taken to step 418.

In step 418, the storage node computing device of the storage platform computing apparatus 12 retrieves the object storing the requested data from local storage (e.g., the local disk storage device(s) 22 or local tape storage device(s) 24), using the retrieved metadata for the object, and returns the object to the requesting one of the client computing devices 30(1)-30(2). If the data must be retrieved from the local tape storage device(s) 24, the storage node computing device 16 optionally sends a request to retrieve the data to the archive node computing device 18, which retrieved the data from the local tape storage device(s) 24 and sends it to the storage node computing device 16 in this example. By retrieving the object from relatively fast local storage when possible, and instead of from the cloud repository 26, the storage node computing device 16 can service read requests more quickly.

However, referring back to step 416, if the storage node computing device 16 determines that the only copy of the object storing the requested data is located in the cloud repository 26, then the Yes branch is taken to step 420. In step 420, the storage node computing device of the storage platform computing apparatus 12 generates a request to read the object to the archive node computing device 18. In response, the archive node computing device 18 generates a request to read the object from the cloud repository 26. In this example, the request generated by the archive node computing device 18 can be an HTTP request, although other types of requests can be used in other examples. Although the archive node computing device 18 is used as the integration to the cloud archive 26 in this particular example, in other examples, the storage node computing device 16 can communicate directly with the cloud archive 26 to retrieve data in response to the client read request.

Optionally, the request is generated based on configuration information associated with the cloud repository 26 in which the object is stored. In order to retrieve the configuration information, the storage node computing device 16 can obtain a unique tag associated with the object in the metadata store 46. The unique tag corresponds to the configuration information and was stored, in this example, as described and illustrated earlier with reference to step 412 of FIG. 4. With the unique tag, the storage node computing device 16 can retrieve the associated configuration information from the memory 36, although other methods of obtaining the configuration information can also be used in other examples. Additionally, the request can be generated based on the location of the object in the cloud repository 26, as also retrieved from the metadata associated with the object in the metadata store 46.

In step 422, the archive node computing device 18 of the storage platform computing apparatus 12 sends the request to the cloud repository 26 using a REST interface provided by the cloud repository and corresponding to the configuration information. Accordingly, in this example, the configuration information includes specifications for the REST interface of the cloud repository 26 (e.g., an endpoint network location) and any access parameters (e.g., an access key) required for the archive node computing device 18 to store the object including the data on the cloud repository 26.

In step 424, the archive node computing device 18 starts receiving the requested object from the cloud repository and streams the object to the requesting storage node computing device 16. In response, the storage node computing device 16 returns the requested data included in the object to the requesting one of the client computing devices 30(1)-30(n) in response to the request received in step 414. Subsequent to returning the object in step 418 or 424, the storage node computing device 16 proceeds to step 401 and another client request is received.

While the exemplary method illustrated in FIG. 4 has been described with reference to client read requests with particular reference to steps 416-424, requests for data can also be initiated by the storage platform computing apparatus 12. For example, an object replica may be lost irreparably from the LDR 44, as determined during an audit process. Accordingly, in this example, the storage node computing device 16 can initiate retrieval of a copy of the object from the archive repository 26, as described and illustrated earlier with reference to step 420 of FIG. 4. In yet other examples, other methods of initiating requests to read data stored in the archive repository 26 can also be used.

Figure 7:
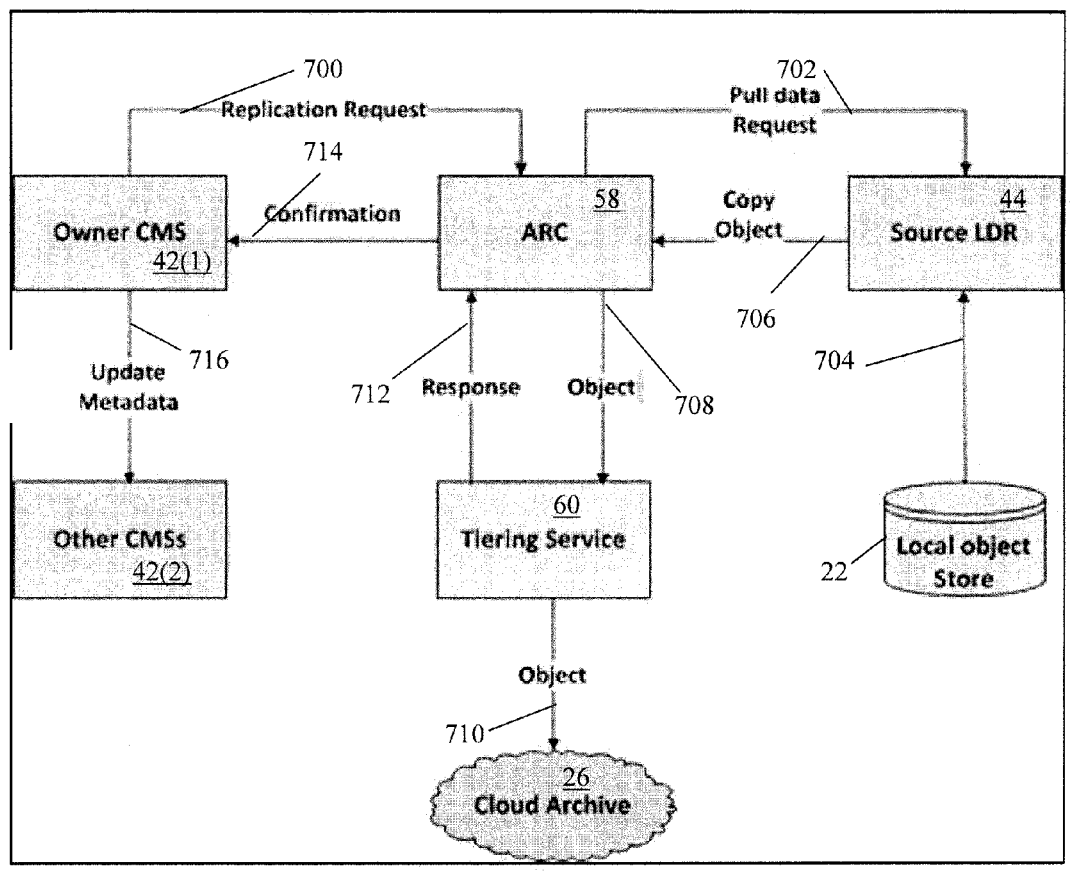
FIG. 7 is a functional flow diagram of processing write requests according to the exemplary method of policy-based data tiering using a cloud architecture.

Referring more specifically to FIG. 7, a functional flow diagram of processing write requests according to the exemplary method of policy-based data tiering using a cloud architecture will now be described. In step 700 in this example, the CMS 42(1) of the storage node computing device 16 sends a replication request to the archive service 58 (referred to as "ARC" in FIG. 7) of the archive node computing device 18. The replication request can be generated as a result of the application of a lifecycle management policy specifying that an object be replicated to the cloud repository 26, for example, as described and illustrated earlier with reference to steps 404-410 of FIG. 4. Accordingly, the replication request can include information regarding the object to be replicated and configuration information for the cloud repository 26 to which the object is to be replicated.

In step 702, the archive service 58 sends a request for a copy of the object to be replicated to the LDR of the storage node computing device 16. In step 704, the LDR 44 of the storage node computing device 16 retrieves a replica of the object from the local disk storage device(s) 22 (referred to as "local object store" in FIG. 7). The LDR 44 can determine the location of the object to be copied by querying the metadata store 46 using information included in the request sent in step 700 and/or 702. In step 706, the LDR 44 sends the copy of the object to the archive service 58 in response to the request sent by the archive service 58 in step 702.

In step 708, the archive service 58 sends a request to store the object to the tiering service 60 of the archive node computing device 18. The request is processed by the request processor 62 and an HTTP request is generated by the HTTP client 64. The HTTP request can be generated using the configuration information received in step 700, as described and illustrated in more detail earlier with reference to step 410 of FIG. 4, and sent to the cloud repository 26, as described and illustrated in more detail earlier with reference to step 412 of FIG. 4.

In step 712, the tiering service 60 of the archive node computing device 18 receives a response from the cloud archive indicating successful storage of object replica on the cloud repository 26 and sends a response indicating the successful storage to the archive service 58. The response optionally includes metadata information, such as the storage location on the cloud archive 26, for example.

In step 714, the archive service 58 of the archive node computing device 18 sends a confirmation message to the CMS 42(1) of the storage node computing device 14. The confirmation message can also include the metadata included in the response sent in step 712. In step 716, the CMS 42(1) updates the metadata for the object in the metadata store 46 by including a reference to the cloud repository 26 storage location for the object and, optionally, an indication of the unique tag for the configuration information for the cloud repository 26. Additionally, the CMS 42(1) of the storage node computing device 16 sends a message prompting any other CMSs 42(2) of other storage node computing devices (now shown) in the enterprise's network to update the metadata for the object in their respective metadata stores.

Figure 8:
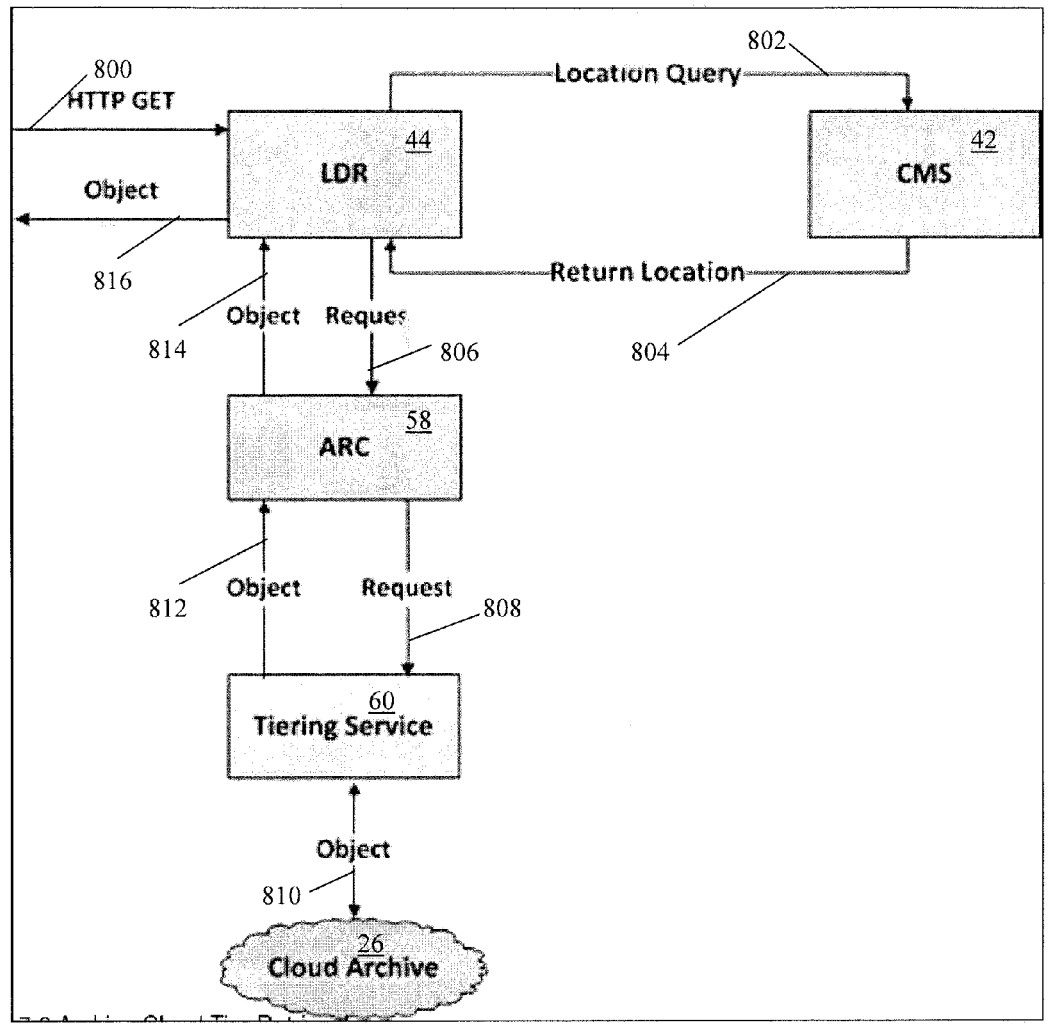
FIG. 8 is a functional flow diagram of processing read requests according to the exemplary method of policy-based data tiering using a cloud architecture

Referring more specifically to FIG. 8, a functional flow diagram of processing read requests according to the exemplary method of policy-based data tiering using a cloud architecture will now be described. In step 800 in this example, the LDR 44 of the storage node computing device 16 receives an HTTP GET request from one of the client computing devices 30(1)-30(n), as described and illustrated earlier with reference to step 414 of FIG. 4. In step 802, the LDR 44 sends a location query request to the CMS 42 of the storage node computing device 16 to determine the storage location of the object storing the requested data based on metadata stored in the metadata store 46.

In step 804, the CMS 42 determines the location for the object and returns the location to the LDR 44 in response to the location query request. Optionally, the CMS 42 determines the configuration information for the cloud repository 26 storing the object based on a unique tag corresponding to the configuration information and stored in the metadata store 46 as associated with the object. In this example, the configuration information can also be returned to the LDR 44 by the CMS 42 in step 804.

In step 806, the LDR 44 of the storage node computing device 16 sends a request to retrieve the object to the archive service 58 of the archive node computing device 18. In this example, the request includes the location of the object and the configuration information for the cloud repository 26. In step 808, the archive service 58 of the archive node computing device 18 sends a request to retrieve the object to the tiering service 60 of the archive node computing device 18 and this request also includes the location of the object and configuration information for the cloud repository.

In step 810, the request processor 62 of the tiering service processes the request and the HTTP client generates and sends an HTTP request to retrieve the object from the cloud repository 26 using the configuration information and object storage location, as described and illustrated in more detail earlier with reference to step 420 and 422 of FIG. 4. In step 812, the tiering service 60 of the archive node computing device 18 streams the object, retrieved from the cloud repository in response to the request sent in step 810, to the archive service 58 of the archive node computing device. In step 814, the archive service 58 streams the object to the LDR 44 of the storage node computing device 16. In response, the LDR 44 sends the object to the requesting one of the client computing devices 30(1)-30(n).

Accordingly, with this technology, enterprises can take advantage of policy-based tiered storage of data wherein one or more of the tiers includes one or more REST-enabled cloud repositories. By including cloud architectures in tiered storage solutions, enterprises gain increased flexibility and scalability and capital expenses relating to data storage can be exchanged for operating expenses. Additionally, this technology facilitates load balancing of archival storage requests based on locality and availability of object copies from multiple geographical locations based on a shared namespace. Moreover, this technology facilitates cost-based tiered storage using cloud repositories having different costs, and other storage specifications, for storing replicas of objects for varying durations.

Additionally, this technology facilitates cloud tier temporary data stores such as when expanding a saturated storage platform is being considered. Object copies can advantageously be stored with this technology in a cloud tier as-is to allow out of band access to the object or obfuscated with the storage platform controlling the namespace. This technology also advantageously facilitates federating between multiple instances of the exemplary platform of this technology in order to facilitate sharing of data and metadata.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for policy-based data tiering using a cloud architecture, the method comprising:
   identifying a lifecycle management policy from a plurality of lifecycle management policies based on at least one of a parameter of a write request and a characteristic of data requested to be written by the write request;

determining that the identified lifecycle management policy indicates multiple storage tiers which at least comprise a first storage tier and a second storage tier;

retrieving configuration information including at least one access parameter for a cloud repository that corresponds to the second storage tier, wherein the access parameter comprises at least one of a login and an access key for the cloud repository;

storing the data as a set of one or more objects to a first storage location corresponding to the first storage tier; and replicating the set of one or more objects to a second storage location corresponding to the cloud repository using the access parameter; and updating metadata for the set of one or more objects to indicate the first and second storage locations and to indicate a unique tag for retrieving the configuration information regardless of changes to the configuration information.

2. The method as set forth in claim 1, further comprising:

based on a request to retrieve the data, retrieving the metadata for the set of one or more objects and at least the access parameter using the unique tag included in the metadata; and obtaining the set of one or more objects from the cloud repository using the access parameter.

3. The method as set forth in claim 1, further comprising, accessing a listing of geographic locations of archive nodes and cloud repositories, which include the cloud repository, to determine which of the archive nodes is geographically closer to the cloud repository, wherein storing the data as the set of objects to the first storage location comprises communicating for storage the set of one or more objects to the archive node determined to be closer to the cloud repository.

4. The method as set forth in claim 1, wherein the identified lifecycle management policy also indicates a third storage tier, the method further comprising, retrieving second configuration information for a second cloud repository corresponding to the third storage tier;

replicating the set of one or more objects to a third storage location corresponding to the second cloud repository using a second access parameter indicated in the second configuration information, wherein the second access parameter comprises at least one of a login and an access key for the second cloud repository; and updating the metadata to also indicate the third storage location and a second unique tag for retrieving the second configuration information regardless of changes to the second configuration information.

5. The method of claim 4, wherein replicating the set of one or more objects to the third storage location occurs after expiration of a first time period based on the lifecycle management policy indicating that data having a first characteristic reside in the second storage tier for the first time period before being moved to the third storage tier, wherein the data has the first characteristic.

6. The method of claim 1 wherein storing the data as the set of one or more objects to the first storage location comprises storing the data as the set of objects in a local storage device or communicating the set of one or more objects to an archive node for storing in archival storage.

7. A non-transitory computer readable medium having stored thereon instructions for policy-based data tiering using a cloud architecture comprising executable code to:

identify a lifecycle management policy from a plurality of lifecycle management policies based on at least one of a parameter of a write request and a characteristic of data requested to be written by the write request;

determine storage tiering indicated in the identified lifecycle management policy;

retrieve configuration information including at least one access parameter for a cloud repository based, at least in part, on the storage tiering indicated in the identified lifecycle management policy, wherein the access parameter comprises at least one of a login and an access key for the cloud repository;

store the data as a set of one or more objects to a first storage location corresponding to a first storage tier of the storage tiering; and replicate the set of one or more objects to a second storage location corresponding to the cloud repository which corresponds to a second storage tier of the storage tiering, wherein the code to replicate comprises code to use the access parameter; and update metadata for the set of one or more objects to indicate the first and second storage locations and to indicate a unique tag for retrieving the configuration information regardless of changes to the configuration information.

8. The non-transitory computer readable medium as set forth in claim 7, further having stored therein code to:

based on a request to retrieve the data, retrieve the metadata for the set of one or more objects and at least the access parameter using the unique tag included in the metadata; and obtain the set of one or more objects from the cloud repository using the access parameter.

9. The non-transitory computer readable medium as set forth in claim 7, further having stored therein executable code to access a listing of geographic locations of archive nodes and cloud repositories, which include the cloud repository, to determine which of the archive nodes is located geographically closer to the cloud repository than one or more other of the archive nodes, wherein the code to store the data as the set of objects to the first storage location comprises the code to communicate the set of one or more objects to the archive node determined to be closer to the cloud repository.

10. The non-transitory computer readable medium as set forth in claim 7, wherein the identified lifecycle management policy also indicates a third storage tier for the storage tiering, non-transitory computer readable medium further comprising code to, retrieve second configuration information for a second cloud repository corresponding to the third storage tier;

replicate the set of one or more objects to a third storage location corresponding to the second cloud repository using a second access parameter indicated in the second configuration information, wherein the second access parameter comprises at least one of a login and an access key for the second cloud repository; and update the metadata to also indicate the third storage location and a second unique tag for retrieving the second configuration information regardless of changes to the second configuration information.

11. The non-transitory computer readable medium of claim 10, wherein replication of the set of one or more objects to the third storage location is dependent upon expiration of a first time period based on the lifecycle management policy indicating that data having a first characteristic reside in the second storage tier for the first time period before being moved to the third storage tier, wherein the data has the first characteristic.

12. The non-transitory computer readable medium of claim 7 wherein the code to store the data as the set of one or more objects to the first storage location comprises code to store the data as the set of objects in a local storage device or to communicate the set of one or more objects to an archive node for storing in archival storage.

13. A storage platform computing apparatus comprising:
a processor;
a network interface;
a machine-readable medium comprising instructions executable by the processor to cause the storage platform computing apparatus to,
identify a lifecycle management policy from a plurality of lifecycle management policies based on at least one of a parameter of a write request and a characteristic of data requested to be written by the write request;
determine storage tiering indicated in the identified lifecycle management policy;
retrieve configuration information including at least one access parameter for a cloud repository based, at least in part, on the storage tiering indicated in the identified lifecycle management policy, wherein the access parameter comprises at least one of a login and an access key for the cloud repository;
store the data as a set of one or more objects to a first storage location corresponding to a first storage tier of the storage tiering; and
replicate the set of one or more objects to a second storage location corresponding to the cloud repository which corresponds to a second storage tier of the storage tiering, wherein the instructions to replicate comprise instructions to use the access parameter; and
update metadata for the set of one or more objects to indicate the first and second storage locations and to indicate a unique tag for retrieving the configuration information regardless of changes to the configuration information.

14. The storage platform computing apparatus as set forth in claim 13, wherein the machine-readable medium further comprises instructions executable by the processor to cause the apparatus to:
based on a request to retrieve the data, retrieve the metadata for the set of one or more objects and at least the access parameter using the unique tag included in the metadata; and
obtain the set of one or more objects from the cloud repository using the access parameter.

15. The storage platform computing apparatus as set forth in claim 13, wherein the machine-readable medium further comprises instructions executable by the processor to cause the apparatus to access a listing of geographic locations of archive nodes and cloud repositories, which include the cloud repository, to determine which of the archive nodes is located geographically closer to the cloud repository than one or more other of the archive nodes, wherein the instructions to store the data as the set of objects to the first storage location comprises the instructions to communicate the set of one or more objects to the archive node determined to be closer to the cloud repository.

16. The storage platform computing apparatus as set forth in claim 13,
wherein the identified lifecycle management policy also indicates a third storage tier for the storage tiering,
the machine-readable medium further comprising instructions executable by the processor to cause the apparatus to,
retrieve second configuration information for a second cloud repository corresponding to the third storage tier;
replicate the set of one or more objects to a third storage location corresponding to the second cloud repository using a second access parameter indicated in the second configuration information, wherein the second access parameter comprises at least one of a login and an access key for the second cloud repository; and
update the metadata to also indicate the third storage location and a second unique tag for retrieving the second configuration information regardless of changes to the second configuration information.

17. The storage platform computing apparatus of claim 16, wherein replication of the set of one or more objects to the third storage location is dependent upon expiration of a first time period based on the lifecycle management policy indicating that data having a first characteristic reside in the second storage tier for the first time period before being moved to the third storage tier, wherein the data has the first characteristic.

* * * * *